US012341234B1

(12) United States Patent
Early

(10) Patent No.: US 12,341,234 B1
(45) Date of Patent: Jun. 24, 2025

(54) APPARATUS AND METHOD FOR MOUNTING AN ANTENNA

(71) Applicant: ConTronX Design L.L.C., Kalamazoo, MI (US)

(72) Inventor: Conor Powers Early, Kalamazoo, MI (US)

(73) Assignee: ConTronX Design L.L.C., Kalamazoo, MI (US)

( * ) Notice: Subject to any disclaimer, the term of this patent is extended or adjusted under 35 U.S.C. 154(b) by 0 days.

(21) Appl. No.: 18/830,420

(22) Filed: Sep. 10, 2024

(51) Int. Cl.
*H01Q 1/12* (2006.01)
*H01Q 1/00* (2006.01)
*H01Q 1/10* (2006.01)

(52) U.S. Cl.
CPC ........... *H01Q 1/1235* (2013.01); *H01Q 1/005* (2013.01); *H01Q 1/10* (2013.01)

(58) Field of Classification Search
CPC ...... H01Q 1/2241; H01Q 1/282; H01Q 1/325; H01Q 1/3266; H01Q 1/1235; H01Q 1/005; H01Q 1/10
See application file for complete search history.

(56) References Cited

U.S. PATENT DOCUMENTS

| | | | | |
|---|---|---|---|---|
| 4,567,487 | A * | 1/1986 | Creaser, Jr. | H01Q 1/20 343/900 |
| 8,737,064 | B2 | 5/2014 | Son et al. | |
| 10,290,933 | B2 | 5/2019 | Sterbenz et al. | |
| 2008/0074329 | A1* | 3/2008 | Caballero | H01Q 1/088 343/702 |
| 2013/0068915 | A1 | 3/2013 | Yang | |
| 2014/0191096 | A1 | 7/2014 | Wiercinski et al. | |
| 2021/0005368 | A1 | 1/2021 | Breiwa et al. | |

FOREIGN PATENT DOCUMENTS

| | | |
|---|---|---|
| CN | 115812264 A | 3/2023 |

* cited by examiner

*Primary Examiner* — Awat M Salih
(74) *Attorney, Agent, or Firm* — Caldwell Intellectual Property Law

(57) ABSTRACT

An apparatus for mounting an antenna. The apparatus includes a body centrally located configured to coordinate a movement and positioning of the antenna, an attachment interface coupled to the body, at least a quick release feature, wherein the at least a quick release feature is configured to detach the antenna from the attachment interface, at least a member coupled to the body, wherein the at least a member extends away from the body, and at least a mounting point coupled to a distal end of the at least a member, the mounting points configured to secure the apparatus to a surface.

19 Claims, 11 Drawing Sheets

APPARATUS AND METHOD FOR MOUNTING AN ANTENNA

FIELD OF THE INVENTION

The present invention generally relates to the field of mechanical devices. In particular, the present invention is directed to an apparatus and a method for mounting an antenna.

BACKGROUND

Antenna mounting systems play a crucial role in optimizing signal reception and transmission for various communication devices. Traditional mounting solutions often lack versatility, making it challenging to adapt to different antenna types, surfaces, and environmental conditions. This inflexibility can lead to suboptimal antenna placement, potentially compromising signal quality and overall system performance. Additionally, many existing mounting apparatuses are cumbersome to install, adjust, or relocate, which can be particularly problematic in situations requiring frequent repositioning or temporary setups.

SUMMARY OF THE DISCLOSURE

In an aspect, an apparatus for mounting an antenna includes a body centrally located configured to coordinate a movement and positioning of the antenna, an attachment interface coupled to the body, at least a quick release feature, wherein the at least a quick release feature is configured to detach the antenna from the attachment interface, at least a member coupled to the body, wherein the at least a member extends away from the body, and at least a mounting point coupled to a distal end of the at least a member, the mounting points configured to secure the apparatus to a surface.

In another aspect, a method for mounting an antenna includes positioning an antenna apparatus on a surface of a vehicle, wherein the antenna apparatus includes a body centrally located configured to coordinate a movement and positioning of the antenna, an attachment interface coupled to the body, at least a quick release feature, wherein the at least a quick release feature is configured to detach the antenna from the attachment interface, at least a member coupled to the body, wherein the at least a member extends away from the body, and at least a mounting point coupled to a distal end of the at least a member, the mounting points configured to secure the apparatus to a surface, adhering the apparatus to a surface using the at least a mounting point, and attaching the antenna to the attachment interface using a quick release feature of the attachment interface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to apparatus and methods for mounting an antenna. The apparatus includes a body centrally located configured to coordinate a movement and positioning of the antenna, an attachment interface coupled to the body, at least a quick release feature, wherein the at least a quick release feature is configured to detach the antenna from the attachment interface, at least a member coupled to the body, wherein the at least a member extends away from the body, and at least a mounting point coupled to a distal end of the at least a member, the mounting points configured to secure the apparatus to a surface.

Figure 1B:
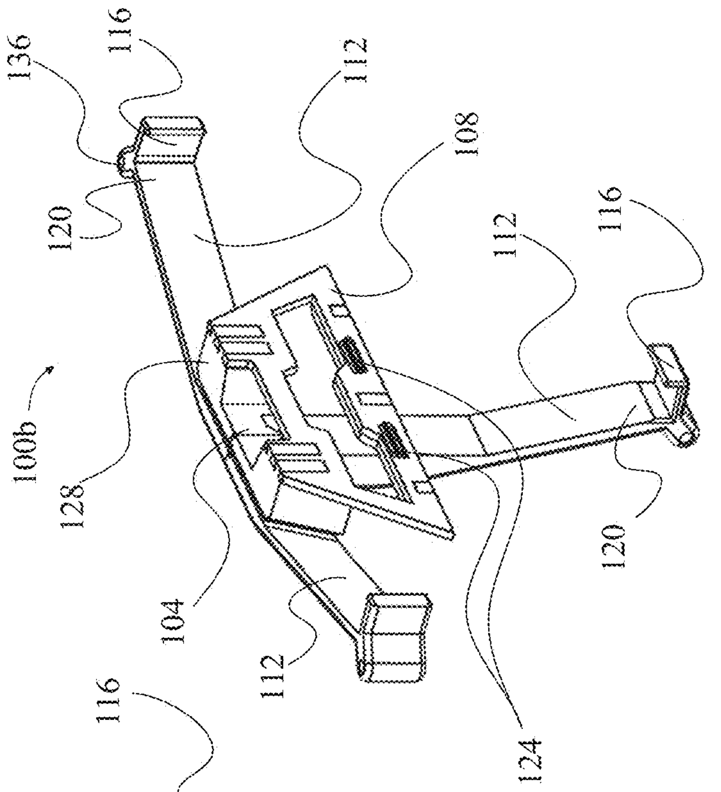
FIG. 1B is an isometric view of an exemplary illustration of a three-membered apparatus for mounting an antenna.
Figure 1A:
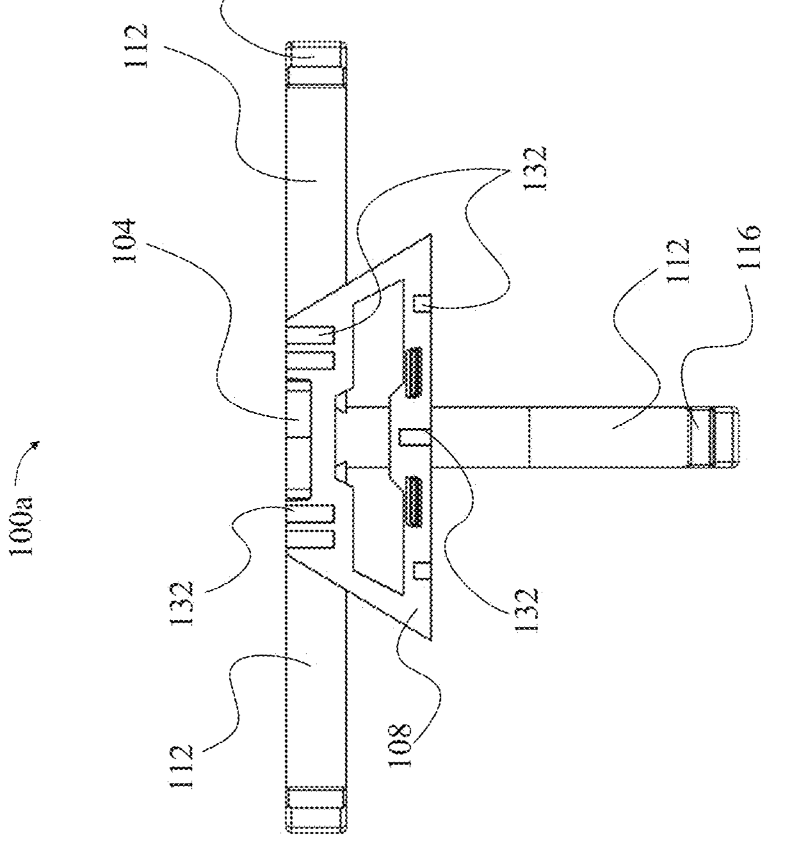
FIG. 1A is a front view of an exemplary illustration of a three-membered apparatus for mounting an antenna.

Referring now to FIG. 1A-B, an exemplary embodiment of apparatus 100*a-b* for mounting an antenna is illustrated. Apparatus 100*a-b* includes body to hold an antenna. As used in this disclosure, an "antenna" is a device used to transmit or receive electromagnetic waves. In a non-limiting example, the antenna may be mounted to apparatus 100*a-b* and adjusted to optimize signal reception or transmission. As used in this disclosure, a "body" is the central structural component of the apparatus. Without limitation, the body 104 may serve as a hub where the at least a member 112 is joined. Without limitation, the body 104 may be designed to ensure the stability and functionality of the apparatus. Without limitation, the body may be 0.5 to 20 inches in length. Without limitation, the body may be 0.5 to 20 inches in height. Without limitation, the body may be 0.5 to 10 inches in width. In another non-limiting example, the body 104 may be constructed from various durable materials to provide strength while minimizing weight. For example, without limitation, the body 104 may be made of aluminum, which is lightweight, corrosion-resistant, and durable. Without limitation aluminum may be used for adjustable or heavy-duty mounts. In another non-limiting example, the body 104 may be made from stainless steel, which may provide corrosion resistance and strength. Without limitation, the body 104 may be made from polycarbonate. Without limitation, polycarbonate may be impact-resistant and durable, used for lightweight mounts. In another non-limiting example, the body 104 may be made from carbon fiber, which is lightweight and strong, and may be used in high-performance or precision mounts.

With continued reference to FIG. 1A-B, the body may be manufactured using various techniques to ensure precision and durability. For instance, without limitation, the body 104 may be 3D printed to allow for complex shapes and custom designs. In another non-limiting example, the body 104 may be manufactured through injection molding, which may be ideal for mass production, providing consistent quality and strength. Be In another non-limiting example, the body 104 may be manufactured through machining, which may be used for metal components. Without limitation, machining the body 104 may offer high precision and durability. Without limitation, the body 104 may include additional features to enhance its functionality, such as a handle for easy transport and positioning of the apparatus, mounting points integrated into the body 104 to provide secure attachment to various surfaces. In another non-limiting example, the body 104 may include an attachment interface 108 designed to connect with the antenna and allow for multi-directional positioning and adjustments. Continuing, the body 104 may feature integrated cable management systems to organize and protect antenna cables, ensuring a neat and efficient setup. For example, without limitation, the body 104 may include a hook and loop tie to gather the cables in one area.

Still referring to FIG. 1A-B, the apparatus includes attachment interface 108 coupled to the body 104. As used in this disclosure, an "attachment interface" is a component of the apparatus that provides a point of connection between the antenna and the rest of the mounting system. Without limitation, the attachment interface 108 may include mechanisms for securing, adjusting, and or orienting the antenna. For instance, without limitation, the attachment interface 108 may include a universal joint, a locking mechanism, and may be made of vibration-dampening materials, to allow multi-directional positioning and accommodate various antenna models.

With continued reference to FIG. 1A-B, the attachment interface 108 may include a standoff feature 128. As used in this disclosure, a "standoff feature" is a structural element that creates separation or spacing between two components or surfaces. Without limitation, the standoff feature 128 may serve to prevent direct contact between the apparatus 100*a-b* and the antenna and/or to allow for the passage of other elements (e.g., wires, air, or fluid), and/or provide structural support while maintaining a specific distance. Without limitation, the standoff feature 128 may be designed to ensure that the antenna properly aligns and nests within the attachment interface 108, providing secure and stable positioning. Continuing, the standoff feature 128 may create a controlled spacing that allows the antenna to be supported and held in place with the necessary precision, much like a cradle that firmly yet gently secures an object. This arrangement may maintain the antenna's proper orientation and minimize the risk of mechanical stress or interference, optimizing its performance within the system.

With continued reference to FIG. 1A-B, the attachment interface 108 may include a universal joint. Without limitation, the universal joint may allow multi-directional positioning of the antenna. As used in this disclosure, a "universal joint" is a mechanical connection between two shafts that allows them to transmit rotational motion while accommodating angular misalignment between them. Without limitation, the universal joint may enable movement in multiple directions, providing flexibility in positioning and orientation. In a non-limiting example, the universal joint may facilitate the multi-directional positioning of the antenna, allowing it to be adjusted to achieve optimal alignment for signal reception.

With continued reference to FIG. 1A-B, the attachment interface 108 may include a locking mechanism. As used in this disclosure, a "locking mechanism" is a component or system designed to secure parts of an apparatus in a fixed position, preventing unintended movement or disassembly. Without limitation, the locking mechanism may ensure that the antenna remains securely positioned once it is adjusted to the desired angle or orientation, maintaining stability and performance during operation. In a non-limiting example, a screw locking mechanism may be used to lock the attachment interface 108 in place. Without limitation, the screw locking mechanism may involve a threaded screw or bolt that, when tightened, presses against a surface or component to hold it securely. Continuing, the screw locking mechanism may be used to fix the angle and orientation of the antenna after adjustments are made. Continuing, the user may tighten the screw to lock the antenna in place, providing a reliable and adjustable solution for maintaining alignment. In another non-limiting example a lever locking mechanism may be used to secure the antenna in place. Without limitation, he lever locking mechanism may be rotated into a locked position, where it applies pressure against a clamping surface to hold the antenna firmly. Continuing, the level locking mechanism may be easy to use and users may quickly engage or release the lock with a simple motion. Continuing, the lever locking system may permit quick re-positioning of the antenna without requiring tools.

With continued reference to FIG. 1A-B, the attachment interface 108 may be configured to allow translational movement of the antenna. In a non-limiting example, the attachment interface 108 may include guides and or rails that interface with the body 104 configured to adjust the attachment interface 108 left, right, up, or down. For instance, without limitation, the attachment interface 108 may include linear bearings that slide along precision-engineered rails, allowing the antenna to be smoothly repositioned in any direction. Continuing, this feature may enable users to make fine adjustments to the antenna's position, optimizing signal reception without the need for complex tools or equipment. Continuing, the guides and rails may be made from durable materials such as stainless steel or anodized aluminum to ensure long-lasting performance and resistance to environmental factors. In another non-limiting example, the attachment interface 108 may utilize a rack and pinion mechanism to facilitate translational movement. Continuing, the rack, a linear gear, may be integrated into the body 104 of the apparatus, while the pinion, a small gear, may be coupled to the attachment interface 108. Without limitation, by turning a knob or handle connected to the pinion, a user may move the attachment interface 108 precisely along the rack. Continuing, the rack and pinion may be constructed from high-strength polymers or metals to ensure durability and smooth operation.

With continued reference to FIG. 1A-B, the attachment interface 108 may be configured to allow rotational movement of the antenna. In a non-limiting example, the attachment interface 108 may include a swivel joint that allows the antenna to rotate 360 degrees around a vertical axis. Continuing, this feature may enable users to easily change the direction of the antenna without needing to reposition the entire apparatus, making it convenient for fine-tuning signal alignment. In another non-limiting example, the attachment interface 108 may include a gimbal mechanism to facilitate multi-axis rotation. As used in this disclosure, a "gimbal" is a pivoted support that allows the rotation of an object about a single axis or multiple axes. Without limitation, the gimbal may allow the antenna to be rotated vertically and diagonally. Without limitation, the gimbal may provide comprehensive control over the antenna's orientation, allowing users to adjust the tilt and angle to achieve the best possible signal reception. Continuing, the gimbal may be constructed from durable materials such as stainless steel or high-strength polymers to ensure smooth and reliable operation. Additionally and or alternatively, the attachment interface 108 may feature a ball-and-socket joint to allow for omni-directional rotation. As used in this disclosure, a "ball-and-socket joint" consists of a spherical ball fitting into a concave socket. Continuing, this design may enable the antenna to be rotated and tilted freely, offering maximum flexibility in positioning. Without limitation, users may easily adjust the antenna's orientation by loosening a locking mechanism, repositioning the antenna, and then tightening the lock to secure it in place. Continuing, the ball-and-socket joint may be made from materials like anodized aluminum or reinforced plastic to provide a balance of strength and lightweight performance.

With continued reference to FIG. 1A-B, the attachment interface 108 may be configured to accommodate multiple antenna models. Without limitation, the attachment interface 108 may be designed with multiple receiving port features 132 to accommodate various antenna models. As used in this disclosure, a "receiving port feature" is a structural element of the attachment interface that is designed to engage and secure various antenna models. Without limitation, the apparatus 100*a-b* may include one or more receiving port features 132. Without limitation, the receiving port feature 132 may facilitate proper alignment and retention of the antenna within the attachment interface 108, ensuring stable connection and functionality. In a non-limiting example, the receiving port feature 132 may include grooves, slots, or other recessed or contoured structures that precisely fit the corresponding parts of different antenna models. Continuing, these features may enable the attachment interface 108 to accommodate antennas of varying designs by providing tailored engagement points that ensure secure positioning and alignment within the interface. Continuing, this feature may enhance the versatility and adaptability of the apparatus by allowing different types of antennas to be easily mounted and securely attached. Without limitation, the grooves and slots may be strategically positioned and dimensioned to fit a range of antenna base designs. In a non-limiting example, the attachment interface 108 may provide a solution for users who may need to switch between different antennas for various applications or upgrades. In a non-limiting example, inclusion of multiple grooves and slots on the attachment interface 108 may allow for quick and easy installation of antennas without the need for additional adapters or modifications. For example, each groove or slot may be engineered to match common industry standards and antenna designs, ensuring compatibility and a snug fit. Continuing, this flexibility may reduce the need for specialized equipment or tools, making the process of changing antennas straightforward and efficient. Without limitation, users may easily align the antenna base with the appropriate receiving port, slide it into position, and secure it using an integrated locking mechanisms, such as clamps or screws, to ensure stability during operation. Without limitation, as new antenna models are developed with different shapes, sizes, and functionalities, the attachment interface 108's design may allow users to adapt their equipment without requiring a completely new mounting system.

With continued reference to FIG. 1A-B, the attachment interface 108 may be made of vibration-dampening materials to minimize movement of the antenna. In a non-limiting example the vibration-dampening material may absorb and dissipate kinetic energy, reducing the impact of external vibrations caused by environmental factors such as wind, rain, or nearby machinery. In a non-limiting example, the vibration-dampening material used in the attachment interface 108 may include elastomers such as neoprene, silicone, or EPDM (ethylene propylene diene monomer). Continuing, these materials may possess mechanical properties, including flexibility, resilience, and resistance to temperature variations. Continuing, neoprene, for instance, may provide chemical stability and may effectively absorb vibrations without degrading over time. Continuing, silicone may provide resistance and durability. Continuing, EPDM may provide weather resistance and may be effective in dampening low-frequency vibrations. Additionally and or alternatively, the vibration-dampening materials may include designing the interface with layered structures or incorporating specific geometries that enhance the material's ability to absorb energy. For example, without limitation, the attachment interface 108 may include a composite structure with alternating layers of different materials, each contributing unique properties to the overall dampening effect. Additionally and or alternatively, the attachment interface 108 may be designed with strategically placed voids or channels that allow for greater material deformation, increasing its capacity to absorb vibrations.

Figure 2A:
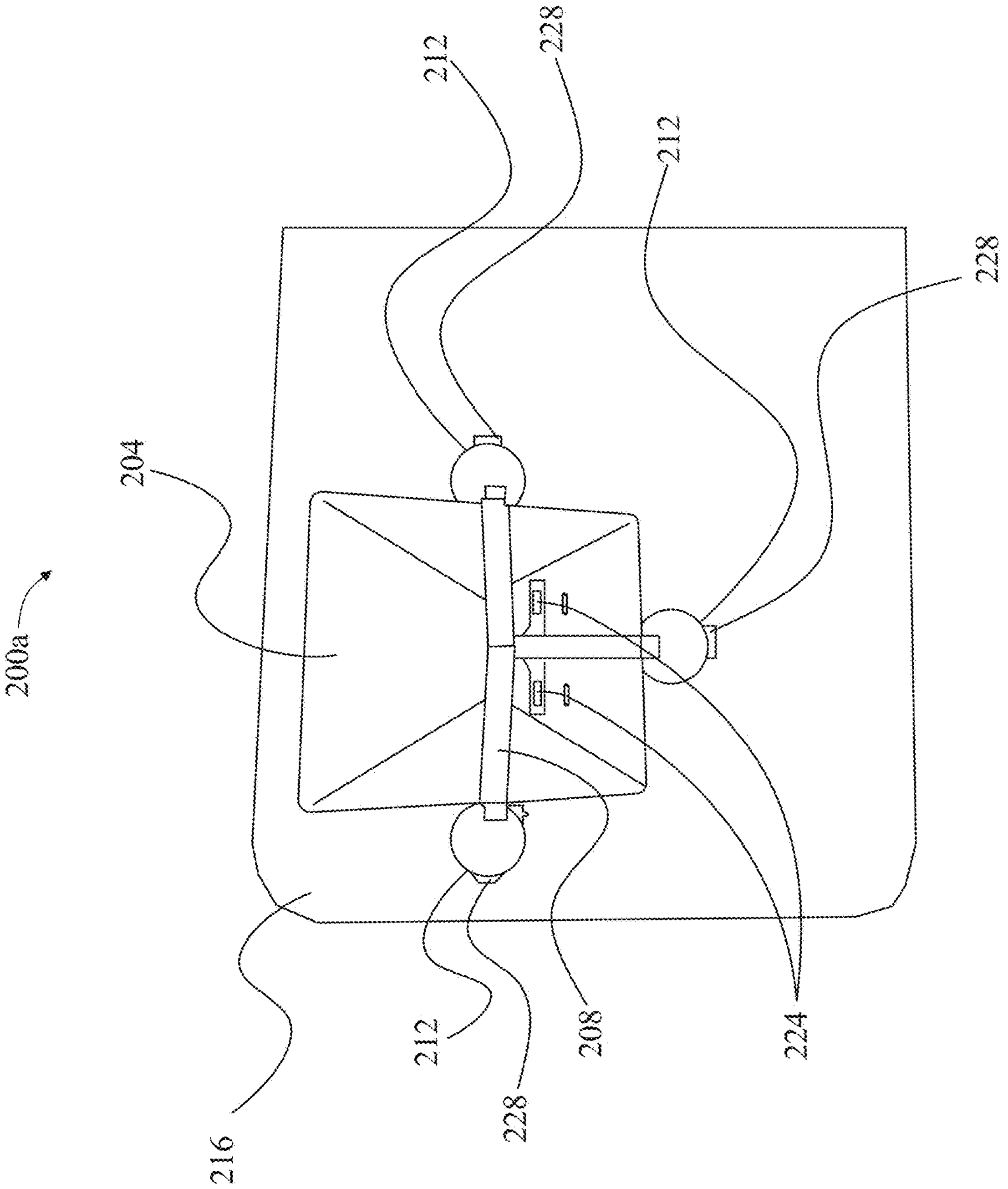
FIG. 2A is an exemplary illustration of a back view of a three-membered apparatus mounting an antenna to a vehicle window using suction cups.

Still referring to FIG. 1A-B, the apparatus includes at least a quick release feature 124, wherein the at least a quick release feature 124 is configured to detach the antenna from the attachment interface 108. As used in this disclosure, a "quick release feature" is a mechanism that allows for the detachment or attachment of components. Without limitation, the quick release feature 124 may allow the detachment or attachment of the antenna from the attachment interface 108. For instance, without limitation, the at least a quick release feature 124 may include a push-button mechanisms as illustrated in FIG. 2A.

With continued reference to FIG. 1A-B, in another non-limiting example, the quick release feature 124 may include a sliding bar or latch that, when moved to a designated position, releases the component. Without limitation, the sliding bar or latch may provide a fast attachment and detachment system requiring minimal effort. In another non-limiting example, the quick release feature 124 may include a lever system that, when lifted or rotated, releases the locking element holding the antenna in place. Continuing, the lever system may provide a secure hold when engaged and may be operated quickly to attach or detach components.

With continued reference to FIG. 1A-B, the at least a quick release feature 124 may include a second quick release feature securing the apparatus 100*a*-*b* to a surface. In a non-limiting example, the second quick release feature may be used to detach the apparatus 100*a*-*b* from the surface. In a non-limiting example, at least a quick release feature 124 used to attach and or remove the apparatus 100*a*-*b* from the surface may be consistent with one or more aspects of the at least a quick release feature 124 used to attach and or detach the antenna from the attachment interface 108 as described above. Without limitation, the second quick release feature is further described and illustrated in FIG. 2A-B.

Still referring to FIG. 1A-B, the apparatus includes at least a member 112 coupled to the body 104, wherein the at least a member 112 extends away from the body 104. As used in this disclosure, a "member" is one or more structural elements extending away from the body 104 of the apparatus. Without limitation, the at least a member may be 3 to 10 inches in length. Without limitation, the at least a member may be 0 to 3 inches in width. Without limitation, the at least a member may include one or more of a rectangular cross-sectional profile, a circular cross-sectional profile, a square cross-sectional profile, an oval cross-sectional profile, and the like. In a non-limiting example, the at least a member 112 may be adjusted in length. In another non-limiting example, the at least a member 112 may be designed to support and position the antenna. In a non-limiting example, the at least a member 112 may be designed with flexible material to accommodate different models and configurations. Without limitation, the apparatus may include two members. In another non-limiting example, the apparatus may include three members. In another non-limiting example, the apparatus may include 4 members. In a non-limiting example, the two members may extend symmetrically downward from the central body. Continuing, the antenna may sit in the two members using gravity to hold the antenna in place. Without limitation, this configuration may provide balanced support and easy maneuverability, making it ideal for lightweight antennas or temporary setups where rapid adjustments are needed. Without limitation, each arm may be adjusted in length and angle, allowing for precise positioning and ensuring stability.

In another embodiment, the apparatus may feature three members arranged in a triangular pattern around the central body. In another non-limiting example, the two of the three members may be directly across from each other in a horizontal line while the third member may be configured vertically down and away from the body 104. Continuing, the three member configuration may enhance stability and provide a wider range of positioning options, making it suitable for larger or heavier antennas. Continuing, the triangular configuration may reduce the risk of tipping and allows for complex positioning, which is essential for optimal signal reception.

In another embodiment, for more demanding applications, the apparatus may include 4 members. Without limitation, the 4 members may be arranged symmetrically to form a "plus" or "cross" shape. Without limitation, this embodiment may enable positioning options and ensure that the antenna is securely supported in challenging environments. In another embodiment, the four member design may be configured horizontally, with two members directly opposite from the other two members.

With continued reference to FIG. 1A-B, the at least a member 112 may include a telescopic mechanism, wherein the telescopic mechanism comprises a plurality of sections configured to slide within one another. As used in this disclosure, a "telescopic mechanism" is a mechanical system comprising multiple segments or sections that can extend and retract. In a non-limiting example, the telescopic mechanism may extend and retract within one another, similar to the operation of a telescope. Without limitation, the telescopic mechanism may allow for adjustable length or movement along a linear path, enabling the device to be compact when not in use and extended when required. Without limitation, the telescopic mechanism may employ interlocking or sliding components that maintain alignment and stability during operation. Continuing, the telescopic mechanism may include a plurality of sections wherein each section may lock into place at various lengths to provide the desired reach and positioning. Continuing, the telescopic adjustment may allow users to precisely control the length of the arm, making it easy to adapt the apparatus for different antenna sizes and installation heights. In another non-limiting example, the at least a member 112 may utilize collapsible sections with hinged connections, wherein the at least a member 112 may fold or collapse to adjust its length. Continuing, this design may incorporate a series of articulated joints that allow each segment of the member to fold back upon itself, similar to the folding legs of a camera tripod. Without limitation, when extended, the collapsible sections provide the necessary support and height for the antenna. When retracted, the at least a member 112 may be folded down for easy storage or transportation. In another non-limiting example, the at least a member 112 may also be configured with a screw adjustment mechanism. Without limitation, the screw adjustment mechanism may be configured to allow a user to twist a threaded sleeve or collar to cause the at least a member 112 to lengthen or shorten. Without limitation, in this design, the at least a member may consist of multiple threaded segments that may be rotated to extend or contract the at least a member 112 gradually. Continuing, the screw adjustment mechanism may provide fine control over the length, making it ideal for precise adjustments in sensitive applications where exact measurements are critical. Continuing, the screw adjustment mechanism may also include locking features to ensure that once the desired length is set, it remains stable and secure during operation.

With continued reference to FIG. 1A-B, the at least a member 112 may be configured to accommodate multiple antenna models. In a non-limiting example, the at least a member 112 may include adjustable features and universal connection points to allow users to easily switch between different antenna models without the need for additional tools or modifications. In a non-limiting example, the at least a member 112 may include adjustable clamps or brackets that may be repositioned to fit different antenna bases. Continuing, these adjustable components may slide along the length of the at least a member 112, locking securely in place to provide a stable and customized fit for each antenna model. Additionally and or alternatively, the at least a member 112 may feature interchangeable adapters or inserts that can be swapped out to match the specific mounting patterns or connector types of various antennas.

With continued reference to FIG. 1A-B, the at least a member 112 may be made from a flexible material. Without limitation, utilizing flexible materials may allow the at least a member 112 to conform to various shapes and surfaces, allowing it to be used in diverse environments where rigid structures may be impractical. As used in this disclosure, "flexible material" is material that is capable of bending, deforming, or being shaped without breaking or losing its integrity. Without limitation, flexible materials may be characterized by their ability to adapt to different forms or forces, often returning to their original shape when the force is removed. Continuing, flexible materials may be engineered to provide varying degrees of flexibility, from slight bending to significant stretching, depending on their composition and structure. In a non-limiting example, flexible materials may include polymers, rubbers, certain metals, and textiles that are designed to maintain durability while allowing movement or adaptation to various shapes and surfaces. In a non-limiting example, the flexible material may enable the apparatus to maintain secure contact with irregular or uneven surfaces, ensuring stability, consistent performance, and the like. Without limitation, the flexible material may include polymers and plastics such as silicone, known for its flexibility and temperature resistance, and polyurethane, valued for its elasticity and abrasion resistance. In another non-limiting example, flexible polyvinyl chloride (PVC) may provide resistance, while polyethylene is used in films and containers for its lightweight and moisture-resistant properties. In another non-limiting example, the flexible material may include thermoplastic elastomers (TPE). In another non-limiting example, the flexible material may include rubbers and elastomers like natural rubber, neoprene, EPDM, nitrile rubber, and the like. Without limitation, the at least a member 112 may be made out of one or more flexible materials.

Still referring to FIG. 1A-B, the apparatus includes at least a mounting point 116 coupled to a distal end 120 of the at least a member 112, the mounting points configured to secure the apparatus to a surface. As used in this disclosure, a "mounting point" refers to one or more locations on the apparatus where it can be secured to a surface. In a non-limiting example, the mounting points may include features such as magnets, suction cups, flexible mounting systems, and the like, to ensure stability and adaptability to different surfaces. For instance, without limitation, the at least a mounting point 116 may include magnets, which allow the apparatus to attach securely to metallic surfaces, such as steel frames or vehicles, without additional hardware. Continuing, the magnetic mounting feature may be useful in temporary installations where ease of setup and removal is paramount. Additionally and or alternatively, the at least a mounting point 116 may incorporate suction cups, providing a strong hold on smooth surfaces such as glass, plastic, or polished metal. Continuing, suction cups may be ideal for scenarios where non-invasive mounting is required, as they do not leave marks or require permanent fixtures. Continuing, the at least a mounting point 116 may be equipped with flexible mounting systems that adapt to irregular or uneven surfaces. As used in this disclosure, a "flexible mounting system" is a mounting arrangement that is specifically designed to adapt to irregular, uneven, or varying surface geometries while maintaining stability and secure attachment. Without limitation, the flexible mounting system may be characterized by their ability to conform to the contours of different surfaces, allowing the apparatus 100*a-b* to remain securely in place even in challenging environments. Flexible mounting systems may incorporate mechanical components that provide adjustability, articulation, or movement to achieve optimal positioning and alignment. In a non-limiting example, flexible mounting systems may include articulated arms composed of multiple segments connected by joints. Continuing, these joints may allow for rotational or angular movement, enabling the arm to bend and adjust its position to accommodate uneven surfaces such as a rocky terrain. Continuing, the articulated arms may use locking mechanisms at each joint, such as friction locks or ratcheting systems, to securely hold the arm in the desired position once adjusted. Additionally and or alternatively, the flexible mounting system may include adjustable brackets, which may include sliding or telescoping components. Continuing, these brackets may expand or contract to fit varying surface contours, such as the curved body of a vehicle. Continuing, the brackets may incorporate spring-loaded clamps or rubberized pads that provide a strong grip on the surface while allowing for minor adjustments to ensure the apparatus remains stable. Additionally and or alternatively, the flexible mounting system may feature ball-and-socket joints, which allow for multi-directional movement and fine-tuning of the apparatus's position. Continuing, this setup may be useful for achieving precise alignment in applications where the mounting surface may be uneven or where the apparatus needs to be angled for optimal performance, such as ensuring proper antenna orientation. Continuing, this adaptability may ensure that the apparatus remains stable even when mounted on challenging surfaces, preventing slippage and maintaining the proper alignment of the antenna.

With continued reference to FIG. 1A-B, the apparatus 100*a-b* may include at least a mounting point hole 136. As used in this disclosure, a "mounting point hole" refers to an aperture or opening within the mounting point that allows for the insertion, placement, or securement of various attachment mechanisms. Continuing, without limitation, the at least a mounting point hole 136 may be strategically positioned on the distal end 120 of the apparatus 100*a-b* to enable the connection of external components or fixtures, providing a pathway for mounting devices such as screws, bolts, suction cups, or other fasteners. In a non-limiting example, the mounting point hole 136 may be designed to accommodate screws or bolts for permanent attachment to a surface, ensuring the apparatus remains firmly in place. Alternatively, the mounting point hole 136 may be designed to accept a suction cup stem or magnet, providing flexibility for temporary or non-invasive installations. Continuing, the mounting point hole 136 may vary in size, shape, and configuration depending on the specific mounting needs and surface types, offering adaptability to various environmental conditions and surface characteristics. For instance, without limitation, the mounting point hole 136 on the apparatus 100*a-b* may feature a threaded design for securely fastening screws, or it may be smooth and contoured to fit the stem of a suction cup, allowing for a secure vacuum seal against smooth surfaces. Additionally and or alternatively, the mounting point hole 136 may be integrated with grommets, bushings, or other inserts to accommodate different types of fasteners while reducing wear and ensuring durability.

With continued reference to FIG. 1A-B, without limitation, the apparatus 100*a-b* may be configured to use one or more types of at least a mounting point 116. For instance, a three-membered apparatus may include two suction cups on 2 of the arms and a magnet on the third arm. Continuing, this configuration may provide a versatile mounting solution, allowing the apparatus to adhere securely to both smooth and metallic surfaces. Continuing, the suction cups may be used on glass or polished metal surfaces, while the magnet may attach to any ferromagnetic material, offering flexibility in various installation environments. In another embodiment, the apparatus may feature four members, each equipped with a different type of mounting points. For example, one at least a member 112 may have a suction cup, another may have a magnet, the third may have an adhesive pad, and the fourth may have a clamp. This multi-functional setup would enable the apparatus to be mounted on a wide range of surfaces, including smooth, metallic, irregular, edge surfaces, and the like. Continuing, the adhesive pad may provide a strong bond on flat surfaces, while the clamp may secure the apparatus to edges or poles, enhancing the versatility and adaptability of the mounting system. In another embodiment, the apparatus may include five members, with a combination of mounting points to suit specific applications. For instance, three members could be equipped with suction cups for maximum stability on smooth surfaces, while the remaining two members may have flexible mounting systems, such as articulated arms or adjustable brackets, to conform to irregular or uneven surfaces. Continuing, this configuration may ensure that the apparatus remains stable even in challenging environments, preventing slippage and maintaining the proper alignment of the antenna.

With continued reference to FIG. 1A-B, the at least a mounting point 116 may be configured to allow rotational movement of the apparatus. Without limitation, the at least a mounting point 116 may enable users to rotate the apparatus around its mounting axis, allowing for precise adjustments in the orientation of the antenna to optimize signal reception or transmission. Continuing, the rotational movement may be facilitated through mechanisms such as swivel joints or ball bearings integrated into the mounting point. Without limitation, these components may provide smooth, continuous rotation with minimal friction, ensuring that the antenna can be adjusted quickly and effortlessly. Additionally and or alternatively, the design may include locking mechanisms to secure the apparatus in the desired rotational position once optimal alignment is achieved.

With continued reference to FIG. 1A-B, the apparatus 100*a-b* further may include a support feature coupled to the at least a member 112. As used in this disclosure, a "support feature" is an element designed to provide stability, reinforcement, and/or assistance to a system or device. Without limitation, the support feature may help maintain proper alignment of the antenna, reduce strain on critical components of the apparatus 100*a-b*, and distribute loads effectively to prevent mechanical failure or deformation. In a non-limiting example, the support feature maybe designed to enhance the durability and performance of the apparatus 100*a-b* by ensuring that connected parts remain secure and functional under operational stress or environmental conditions. In a non-limiting example, the support feature may include features that are specifically engineered to protect the apparatus from factors such as physical impact, weather conditions, wear and tear, and other environmental challenges that could degrade performance or cause failure. In a non-limiting example, the apparatus may be equipped with a weather-resistant coating to protect it from harsh environmental conditions such as rain, snow, UV radiation, and temperature extremes. Continuing, this coating may include materials like powder-coated paint or specialized polymers that create a protective barrier against moisture and corrosion. Without limitation, this feature may be beneficial for outdoor installations where the apparatus is exposed to fluctuating weather conditions, such as on rooftops or in open fields. In another non-limiting example, the apparatus may incorporate sealed joints and connections to enhance durability against environmental conditions. Without limitation, this may involve using gaskets, O-rings, sealants, and the like at points where components connect or move, preventing the ingress of water, dust, and debris. Continuing, the sealed joints may ensure that internal mechanisms remain dry and free from contaminants, which may cause wear and malfunction. Specifically, each joint on the apparatus 100*a-b* where components connect or move may be replaced with a sealed joint to help prevent the ingress of water, dust, and debris, thereby improving the longevity and reliability of the system. For instance, without limitation, the attachment interface joint, where the antenna connects to the apparatus 100*a-b*, may incorporate gaskets or O-rings to create a tight seal around the connection point, potentially preventing moisture or debris from entering the antenna housing. Continuing, the mounting point joints, located at the distal ends of the members where the apparatus 100*a-b* is secured to the surface, may benefit from the addition of sealants or rubberized gaskets, which could protect the mounting hardware from corrosion and environmental wear. Continuing, if the members of the apparatus 100*a-b* are adjustable or telescopic, each telescopic joint may be sealed using O-rings or wiper seals, helping to keep out dirt and moisture while allowing smooth movement. The quick release mechanism, which allows for detachment of the antenna, could also incorporate seals around the moving parts, potentially preventing debris from accumulating and impairing functionality. Additionally, the central body of the apparatus, which coordinates the movement and positioning of the antenna, may include sealed internal joints or connections. These seals, such as gaskets or adhesive sealants, could protect the internal mechanisms from environmental exposure, ensuring continued operation in various conditions. Continuing, this feature may be crucial in environments where the mount may encounter heavy rain, snow, dust, and other environmental elements. Without limitation, keeping the internal components protected by including support features such as sealed joints may contribute to the overall durability of the apparatus, ensuring consistent operation. In another non-limiting example, the apparatus may be constructed from impact-resistant materials, such as reinforced plastics, aluminum alloys, carbon fiber composites, and the like. Continuing, these materials may provide enhanced strength and resilience against physical impacts, such as hail, falling debris, accidental collisions, and the like. Continuing, impact-resistant materials may be advantageous in environments where the apparatus may be subject to mechanical stresses. Without limitation, the impact-resistant materials may absorb and dissipate impact forces thereby allowing the apparatus to withstand sudden shocks without compromising its functionality or structural integrity.

With continued reference to FIG. 1A-B, the apparatus 100*a-b* may be made of one or more of aluminum, stainless steel, polycarbonate, and carbon fiber. In a non-limiting example, the apparatus may be constructed using a combination of materials such as aluminum, stainless steel, polycarbonate, carbon fiber, and the like.

With continued reference to FIG. 1A-B, the attachment interface 108 may be configured to support multiple antennas simultaneously. Without limitation, the apparatus may include a centralized hub with multiple mounting points or brackets radiating from its core, each specifically designed to hold an individual antenna. Continuing, these mounting points may be adjustable to fit various antenna bases, allowing the interface to support a diverse array of antenna models. Continuing, the interface may resemble a spider-like configuration, with arms or brackets extending outward, providing space for each antenna to be securely mounted without interference from others. To maintain stability and ease of access, the attachment interface 108 may incorporate a modular design, enabling users to attach or detach antennas as needed. Continuing, each mounting point may include adjustable joints or pivoting mechanisms that allow the antennas to be positioned at different angles, optimizing signal reception from multiple directions.

With continued reference to FIG. 1A-B, the apparatus 100*a-b* may be manufactured as a single piece. In an embodiment, the apparatus 100*a-b* may be produced as a single, unified piece, which may enhance the structural integrity and simplify assembly. In an embodiment, the apparatus 100*a-b* single piece embodiment may reduce complexity, minimize assembly time, and enhance the overall efficiency. In an embodiment, the apparatus 100*a-b* may be produced as a single piece using techniques such as injection molding or CNC machining. Continuing, these techniques may be suited for producing complex parts in one continuous process. For example, without limitation, injection molding may allow for the creation of detailed, high-precision components of the apparatus 100*a-b* in a single shot by injecting molten material into a custom-designed mold. Continuing, this method may be particularly advantageous for high-volume production, as it eliminates the need for post-assembly and ensures a consistent and strong structure. Continuing, CNC machining may produce the apparatus 100*a-b* as a single piece by carving it from a solid block of material, as described herein, allowing for high levels of precision and detail.

In an embodiment, the apparatus 100*a-b* may be manufactured from more than one piece. In an embodiment, the apparatus 100*a-b* may be divided into manageable sections based on the limitations of the manufacturing process. For example, without limitation, in 3D printing, complex overhangs and geometric constraints may require splitting the apparatus 100*a-b* into separate pieces to ensure each component can be printed effectively. Continuing, the individual parts may later be assembled using fasteners, adhesives, and/or snap-fit joints. Continuing, manufacturing the apparatus 100*a-b* in multiple pieces may allow for easier customization and repair. In an embodiment, manufacturing the apparatus 100*a-b* in multiple pieces may introduce additional assembly steps and thereby increase production time and cost. In an embodiment, the apparatus 100*a-b* may be manufactured in using multiple pieces may permit the apparatus 100*a-b* to be manufactured using varying materials, depending on the functional requirements of each segment.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Referring now to FIG. 2A, an exemplary illustration 200*a* of a back view of a three-membered apparatus mounting an antenna to a vehicle window using suction cups. In in embodiment, the illustration 200*a* may include the antenna 204, the apparatus 208, at least a mounting point 212, a vehicle window 216, and a push-button mechanism 224. In in embodiment, the apparatus 208 secures the antenna 204 to the vehicle window 216 using at least a mounting point 212. In in embodiment, the antenna 204 may be positioned centrally within the apparatus 208. In in embodiment, the antenna 204 may be designed to transmit or receive electromagnetic waves. In in embodiment, the apparatus 208 may be the central component that holds the antenna 204. In in embodiment, the apparatus 208 may be designed to ensure the stability and functionality of the antenna 204. In in embodiment, the apparatus 208 may include at least a mounting point 212, to secure the apparatus 208 to the vehicle window 216. In in embodiment, at least a mounting point 212 ensures that the apparatus 208 remains stable and properly aligned, allowing the antenna 204 to function effectively. In in embodiment, the multiple at least a mounting point 212 may be used to provide additional stability and support. The vehicle window 216 may serve as the mounting surface for the apparatus 208. In in embodiment, the vehicle window 216 may provide a stable and accessible location for mounting the antenna 204, ensuring that the antenna 204 may be positioned for optimal signal reception and transmission.

In an embodiment, the push-button mechanism 224 may be located on the back of the apparatus 208. As used in this disclosure, a "push-button mechanism" is a mechanical system that incorporates a push-button as the primary means of triggering a specific action. Without limitation, the push-button mechanism 224 may include a spring-loaded button that, when pressed, releases a locking element, such as a pin or latch, that secures the antenna to the attachment interface. In a non-limiting example, the push-button mechanism 224 may be positioned on the back of the apparatus 208, allowing for convenient access while keeping the button discreetly placed. This configuration may be ideal when the apparatus 208 is mounted on a surface, as it permits the user to easily engage or disengage the mechanism without interfering with the main functionality of the apparatus 208. Additionally and or alternatively, the push-button mechanism 224 may be located underneath the apparatus 208, providing a hidden, low-profile option that minimizes the risk of accidental activation. Continuing, this placement may be suitable for scenarios where the apparatus 208 requires a clean, unobstructed front surface. In another non-limiting example, the push-button mechanism 224 may be positioned on the side of the apparatus 208, ensuring easy access for the user while maintaining a balanced design. Continuing, side placement may allow for quick operation without requiring the user to reach behind or beneath the apparatus, making it a practical option for handheld or frequently accessed devices.

Figure 2B:
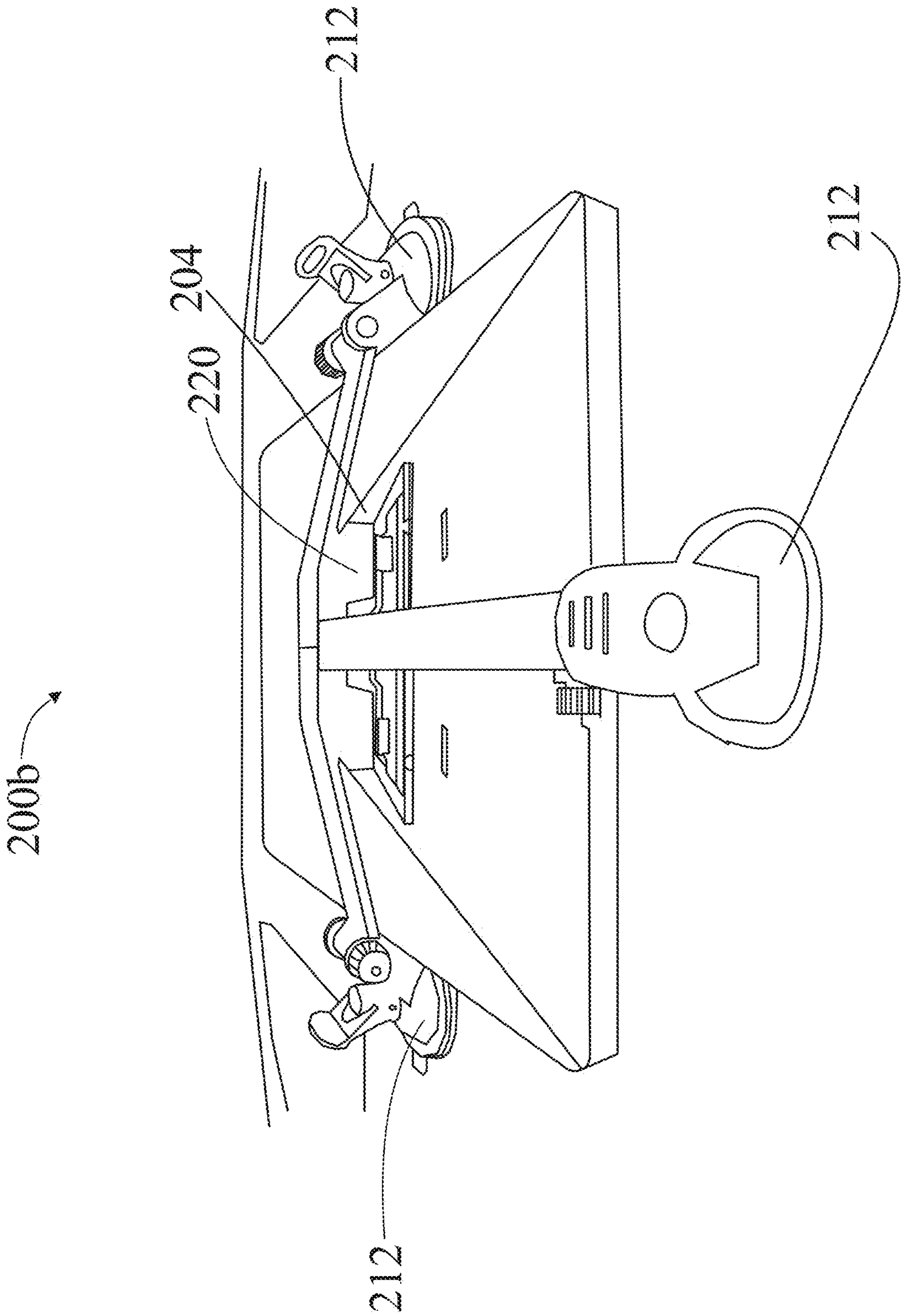
FIG. 2B is an exemplary illustration of a back isometric view of a three-membered apparatus mounting an antenna to a surface using suction cups.

Referring now to FIG. 2B, an exemplary illustration 200*b* of a back isometric view of a three-membered apparatus mounting an antenna to a surface using suction cups. In in embodiment, the illustration 200*a* may include the antenna 204, the apparatus 208, at least a mounting point 212, and an attachment interface 220. In an embodiment, the attachment interface 220 is specifically configured to align with the antenna 204 shape and size, ensuring that the antenna 204 is securely held in place within the apparatus 208. In an embodiment, the antenna 204 may be designed with particular geometric dimensions that allow it to nestle into the attachment interface 220 of the apparatus 208. In an embodiment, the attachment interface 220 may feature contoured or recessed areas that complement the antenna's external profile, ensuring a snug and stable fit. In an embodiment, the alignment may be facilitated by the precise positioning be of the antenna 204 relative to the mounting points 212, which help guide the antenna 204 into its correct orientation within the apparatus 208. In an embodiment, the size of the antenna 204 may be matched to the dimensions of the attachment interface 220, ensuring that there is no unnecessary movement once the antenna 204 is secured. In an embodiment, the attachment interface 220 may include locking or clipping mechanisms that engage with corresponding features on the antenna, further ensuring that the antenna remains securely in place during use. In an embodiment, the use of suction cups on mounting points 212 may provide additional stability by mounting the apparatus to the surface, thereby minimizing the risk of displacement or detachment of the antenna 204. In an embodiment, this configuration may be designed to provide a reliable and secure attachment, even when the apparatus 208 is subjected to external forces or vibrations.

In an embodiment, the apparatus 200*a*-*b* may include a second quick release feature 228. In an embodiment, the second quick release feature 228 may include a clamp feature integrated into the suction cup on the mounting points 212. Without limitation, the clamp feature may provide enhanced stability and security for the apparatus 208 by offering an additional mechanical locking mechanism. Continuing, the clamp may be designed to engage and secure the suction cup more firmly to the surface, thereby reducing the risk of displacement or detachment, particularly in environments where the surface may be uneven or subject to vibrations. Without limitation, the clamp may operate by tightening around the base of the suction cup after it has adhered to the surface, effectively locking the suction in place and preventing it from losing grip. Continuing, the dual-action-suction for initial adhesion and clamping for reinforced stability—may ensure that the antenna 204 remains securely mounted, even under challenging conditions. Continuing, the clamp feature may particularly beneficial when precise positioning of the antenna is crucial for optimal performance, as it minimizes the potential for movement or misalignment that could affect signal reception.

Figure 3B:
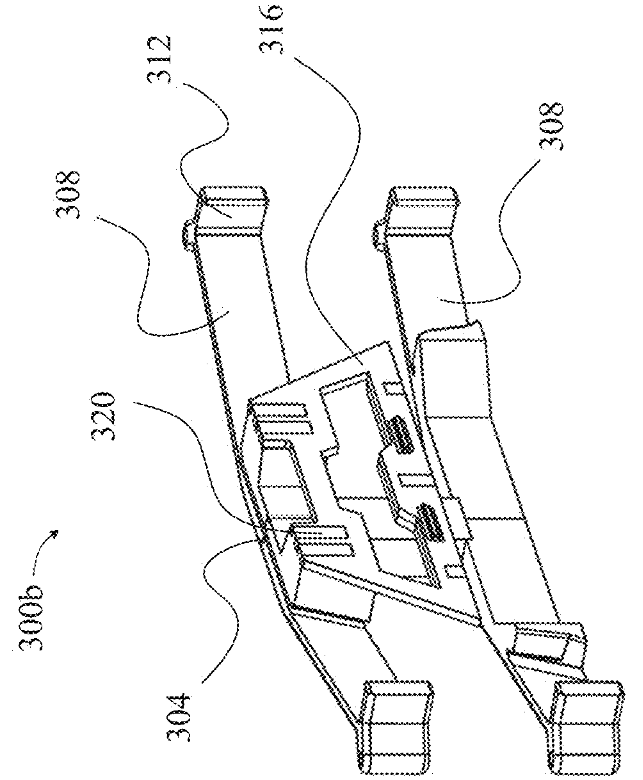
FIG. 3B is an isometric view of an exemplary illustration of a four-membered apparatus for mounting an antenna.
Figure 3A:
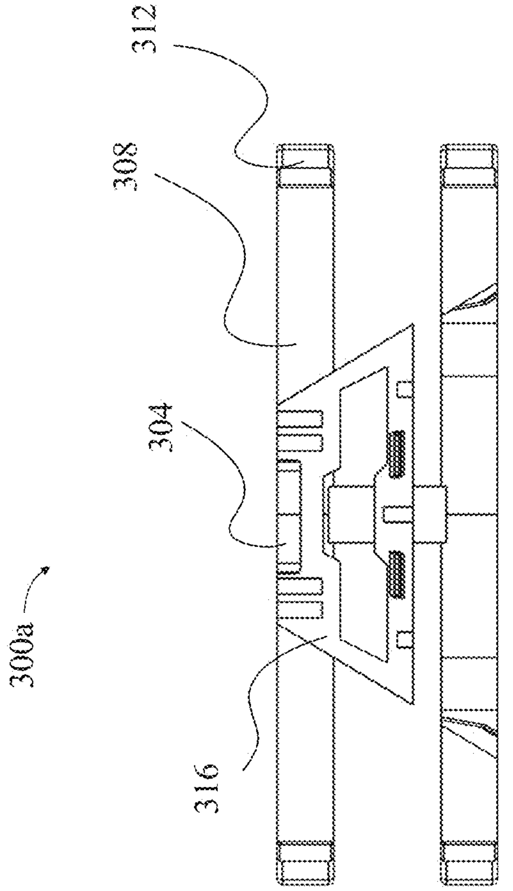
FIG. 3A is a front view of an exemplary illustration of a four-membered apparatus for mounting an antenna.

Referring now to FIG. 3A is a front view 300*a* of an exemplary illustration of a four-membered apparatus for mounting an antenna. FIG. 3B is an isometric view 300*b* of an exemplary illustration of a four-membered apparatus for mounting an antenna. FIG. 3A-B may include a body 304, at least a member 308, at least a mounting point 312, and an attachment interface 316. In in embodiment, the body 304 may serve as the central structural component of the apparatus. In in embodiment, the body 304 coordinates the movement and positioning of the antenna. In in embodiment, the body 304 may be constructed from various durable materials to provide strength while minimizing weight. In in embodiment, the body 304 may include additional features to enhance the functionality, such as integrated cable management systems to organize and protect antenna cables. In in embodiment, the apparatus may include at least a member 308, which extends away from the body 304. In in embodiment, the at least a member 308 may provide support and help position the antenna. In in embodiment, the at least a member 308 may be designed with flexible material to accommodate different models and configurations. In in embodiment, the at least a member 308 may be adjusted in length and may include telescopic mechanisms, collapsible sections, screw adjustment mechanisms, and the like to provide the desired reach and positioning. In in embodiment, the apparatus may include at least a mounting point 312, which is coupled to a distal end of at least a member 308. In in embodiment, the at least a mounting point 312 may secure the apparatus to a surface. In in embodiment, the at least a mounting point 312 may include features such as magnets, suction cups, or flexible mounting systems to ensure stability and adaptability to different surfaces. In in embodiment, the at least a mounting point 312 may enable users to rotate the apparatus around the mounting axis, allowing for precise adjustments in the orientation of the antenna. In in embodiment, the attachment interface 316 may be coupled to the body 304. In in embodiment, the attachment interface 316 may provide a point of connection between the antenna and the rest of the mounting system. In in embodiment, the attachment interface 316 may include mechanisms for securing, adjusting, and orienting the antenna. In in embodiment, the attachment interface 316 may include a universal joint, a locking mechanism, and may be made of vibration-dampening materials to allow multi-directional positioning and accommodate various antenna models. In in embodiment, the attachment interface groove 320 may be part of the attachment interface 316. In in embodiment, the attachment interface groove 320 may accommodate multiple antenna models by providing multiple grooves, slots, receiving ports, and the like. In an embodiment, the attachment interface groove 320 may enhance the versatility and adaptability of the apparatus by allowing different types of antennas to be easily mounted and securely attached. Without limitation, one structural element that enables this adaptability may be the spacing of the attachment interface groove 320. For instance, the attachment interface groove 320 may be spaced farther apart to accommodate larger antenna models, while closer spacing may be suited for smaller antennas. Continuing, this variability in groove placement may allow the attachment interface 316 to adapt to antennas with different physical dimensions. In another non-limiting example, the attachment interface groove 320 may include keyed grooves, which are specifically designed to engage with corresponding features on the antenna. Continuing, these keyed grooves may include notches, protrusions, or specific geometries that match the unique shape of certain antenna models. For example, a keyed groove might have a unique pattern that fits only antennas with a matching profile, ensuring that only compatible antennas can be securely mounted. Continuing, this design feature may enhance both security and precision in mounting, as it prevents incorrect or incompatible antennas from being attached. Additionally and or alternatively, multi-level grooves or slots may be integrated into the attachment interface to accommodate antennas with different mounting depths or configurations. Continuing, these grooves may have varying depths or widths to fit antennas with different base designs, allowing a single interface to serve multiple antenna models. This multi-level design ensures that antennas of different types can be securely mounted without requiring additional adapters or modifications. In some embodiments, the attachment interface groove 320 may also be interchangeable or adjustable, allowing users to configure the attachment interface 316 based on the specific antenna model they intend to use. This flexibility could be achieved through the use of sliding or rotating components within the interface that reposition the grooves or slots to match the desired antenna specifications.

Figure 4:
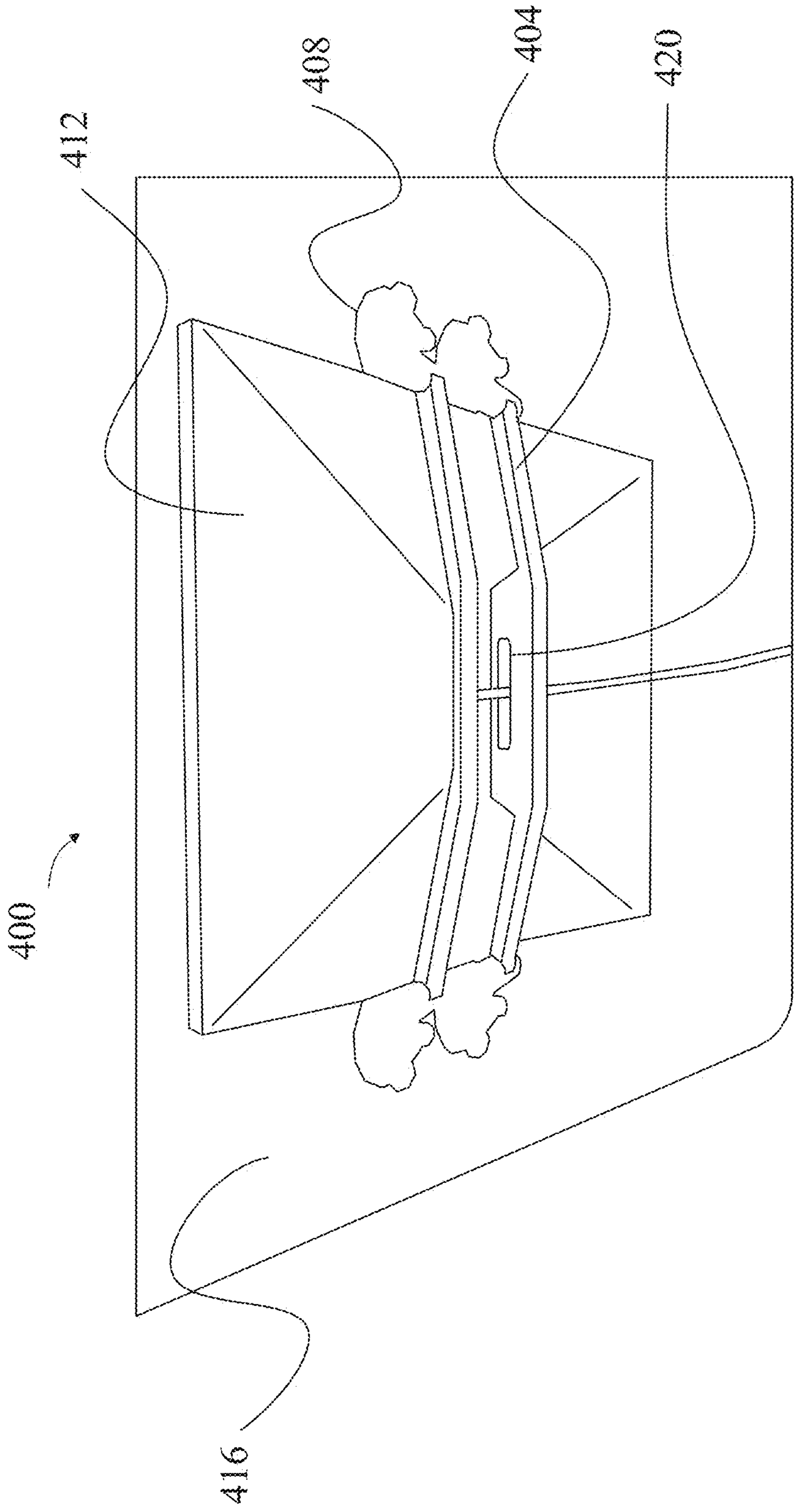
FIG. 4 is an exemplary illustration of a four-membered apparatus mounting an antenna to a vehicle window suction cups.

Referring now to FIG. 4 is an exemplary illustration 400 of a four-membered apparatus mounting an antenna to a vehicle window suction cups. FIG. 4 shows an illustration 400 of an apparatus for mounting an antenna to a vehicle window. In in embodiment, the illustration 400 may include the apparatus 404, at least a mounting point 408, an antenna 412, a vehicle window 416, and a cable port 420. In an embodiment, the apparatus 404 serves as the central component that holds the antenna 412. In in embodiment, the apparatus 404 is designed to ensure the stability and functionality of the antenna 412. In in embodiment, the apparatus 404 may be constructed from various durable materials to provide strength while minimizing weight. In in embodiment, the apparatus 404 may include additional features to enhance the functionality, such as integrated cable management systems to organize and protect antenna cables. In in embodiment, the at least a mounting point 408 is coupled to the apparatus 404. In in embodiment, the at least a mounting point 408 secures the apparatus 404 to the vehicle window 416. In in embodiment, the at least a mounting point 408 may include features such as magnets, suction cups, or flexible mounting systems to ensure stability and adaptability to different surfaces. In in embodiment, the at least a mounting point 408 may enable users to rotate the apparatus 404 around the mounting axis, allowing for precise adjustments in the orientation of the antenna 412. In in embodiment, the antenna 412 is positioned centrally within the apparatus 404. The antenna 412 is designed to transmit or receive electromagnetic waves. In in embodiment, the antenna 412 may be adjusted to optimize signal reception or transmission. In in embodiment, the vehicle window 416 serves as the mounting surface for the apparatus 404. In in embodiment, the vehicle window 416 provides a stable and accessible location for mounting the antenna 412, ensuring that the antenna 412 is positioned for optimal signal reception and transmission. In in embodiment, the cable port 420 is integrated into the apparatus 404. In in embodiment, the cable port 420 allows for the connection of antenna cables, ensuring a neat and efficient setup. In in embodiment, the cable port 420 may include features to protect and organize the cables, maintaining the overall functionality and appearance of the apparatus 404. In an embodiment, the cable port 420 may be located on the lower section of the apparatus 404, near the attachment interface, allowing antenna cables to be routed directly from the antenna to the apparatus 404 in a neat and organized manner. Without limitation, the cable port 420 may be positioned along the side or rear of the apparatus 404, depending on the overall design and intended cable routing pathways. In an embodiment, the cable port 420 may be designed as a pass-through feature on the back of the apparatus 404. Continuing, the pass-through design may allow the antenna cables to be threaded through the apparatus 404 without requiring a physical connection point within the port itself. Continuing, the pass-through configuration may include protective features, such as rubber grommets or cable guides, which help organize the cables and prevent wear or damage as they pass through the apparatus.

Figure 5B:
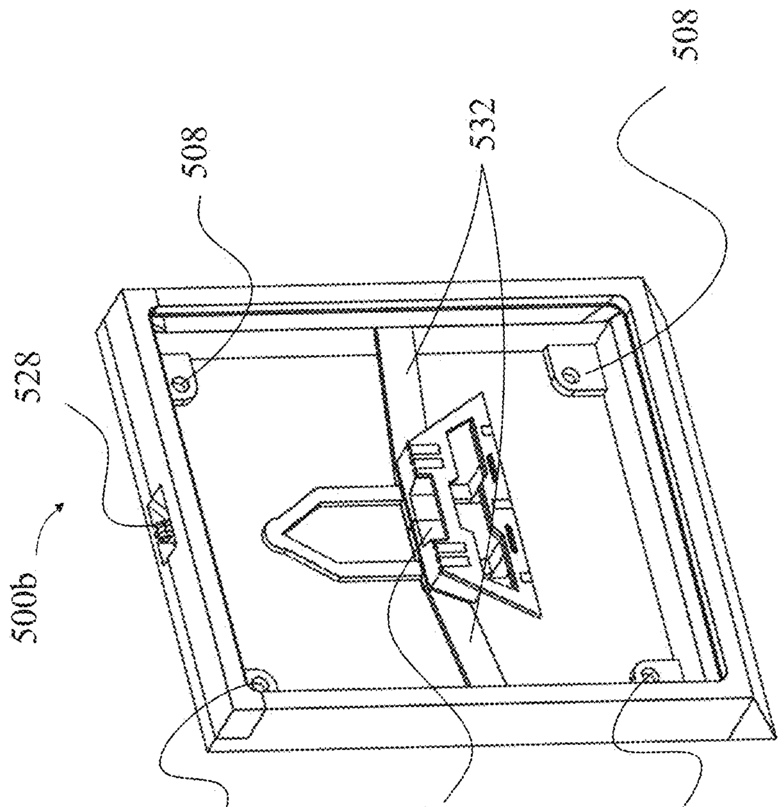
FIG. 5B is an isometric view of an exemplary illustration of an apparatus for mounting an antenna to an exterior of a vehicle.
Figure 5A:
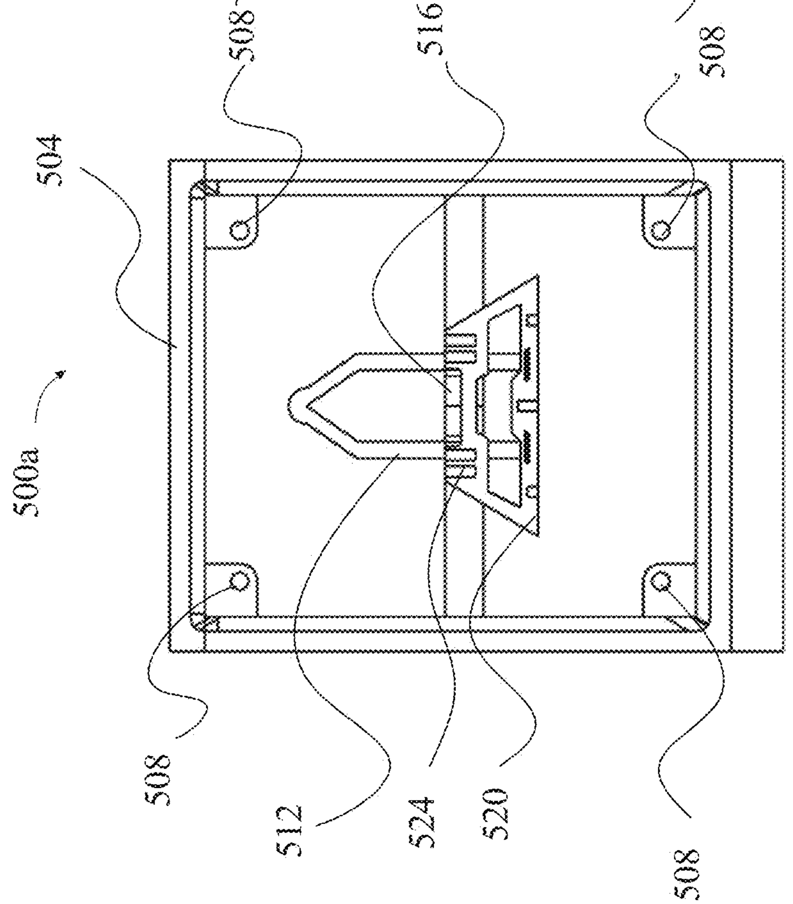
FIG. 5A is a front view of an exemplary illustration of an apparatus for mounting an antenna to an exterior of a vehicle.

Referring now to FIG. 5A is a front view 500*a* of an exemplary illustration of an apparatus for mounting an antenna to an exterior of a vehicle. FIG. 5B is an isometric view 500*b* of an exemplary illustration of the apparatus for mounting the antenna to the exterior of a vehicle. In an embodiment, FIG. 5A and FIG. 5B may include a frame 504, at least a mounting point 508, a support feature 512, a body 516, an attachment interface 520, a groove 524, and a locking mechanism 528. In an embodiment, the frame 504 may serve as the structural boundary of the apparatus, providing support and stability to the entire assembly. In an embodiment, the frame 504 may be constructed from durable materials such as aluminum or stainless steel to ensure robustness and longevity, especially in outdoor environments. In an embodiment, the at least a mounting point 508 may be positioned at the corners of the frame 504. In an embodiment, the at least a mounting point 508 is designed to secure the apparatus to a surface, such as the exterior of a vehicle. at least a mounting point 508 may include features such as magnets, suction cups, flexible mounting systems, and the like to ensure stability and adaptability to different surfaces. In an embodiment, the placement of multiple at least a mounting point 508 ensures that the apparatus remains securely attached, even in challenging conditions. In an embodiment, the support feature 512 may be integrated into the frame 504 to enhance the apparatus's ability to withstand environmental stresses.

With continued reference to FIG. 5A, one or more sealed joints may be coupled to a member of the support feature 512. In an embodiment, the support feature 512 may include weather-resistant coatings, impact-resistant materials, or sealed joints to protect against moisture, dust, and physical impacts. In an embodiment, the support feature 512 may ensure that the apparatus maintains its functionality and integrity over time. In an embodiment, the body 516 is centrally located within the frame 504 and may serve as the main structural component that coordinates the movement and positioning of the antenna. In an embodiment, the body 516 may be weighted to maintain the center of gravity, ensuring stability and reducing the risk of tipping or movement due to wind or other environmental factors. Without limitation, the support feature 512 may act as a shield for the antenna and protect the antenna from exterior forces, objects, and the like.

With continued reference to FIG. 5A, the frame 504 may define a structural boundary of the apparatus wherein the frame 504 may be attached to the attachment interface 520 by the at least a member 532. As used in this disclosure, a "frame" is a structural component that establishes the outer boundary or form of an apparatus. Without limitation, the frame 504 may serve as a foundational support, potentially interacting with various other components within the apparatus. Without limitation, the frame 504 perimeter may be coupled to the at least a member 532. Without limitation, there may be a single at least a member 532 or more than one at least a member 532 used to secure the frame 504 to the attachment interface 520 and the body 516.

With continued reference to FIG. 5A, the attachment interface 520 may be coupled to the body 516 and may provide a point of connection between the antenna and the rest of the mounting system. In an embodiment, the attachment interface 520 may include mechanisms for securing, adjusting, and orienting the antenna. In an embodiment, the groove 524 within the attachment interface 520 is designed to accommodate various antenna models, enhancing the versatility and adaptability of the apparatus. In an embodiment, the locking mechanism 528 may be located on the frame 504. In an embodiment, the locking mechanism 528 may ensure that the antenna remains stable and properly aligned during operation, preventing accidental disconnection or misalignment. Without limitation, the locking mechanism 528 may be located on the top perimeter of the frame 504. Without limitation, the locking mechanism 528 may be located on the bottom perimeter of the frame 504, the back or front of the frame 504, the side of the frame 504 and the like.

Figure 6B:
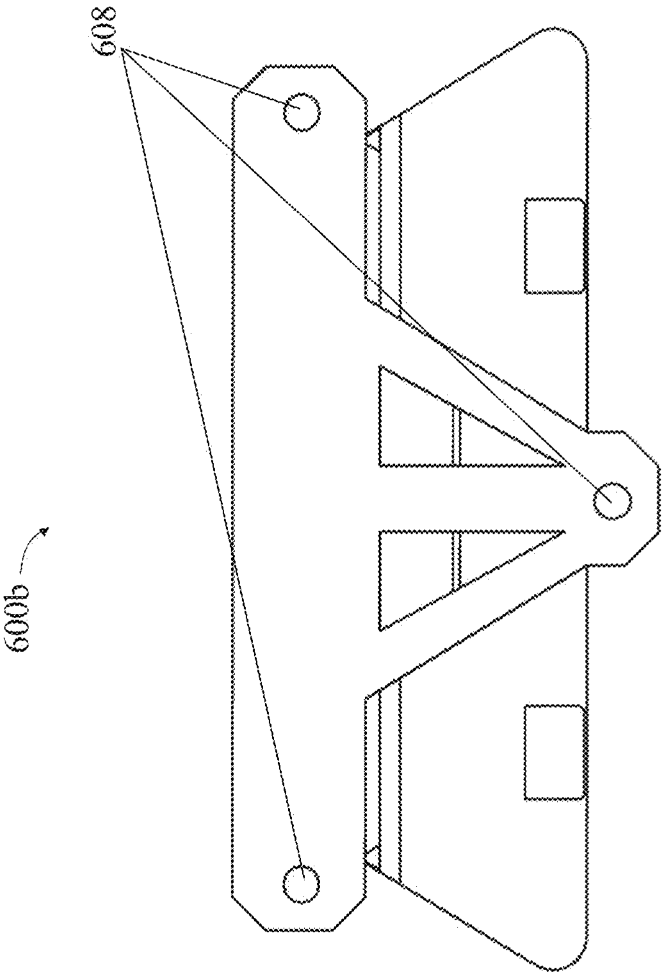
FIG. 6B is an illustration of a top view of an apparatus with at least a mounting interface.
Figure 6A:
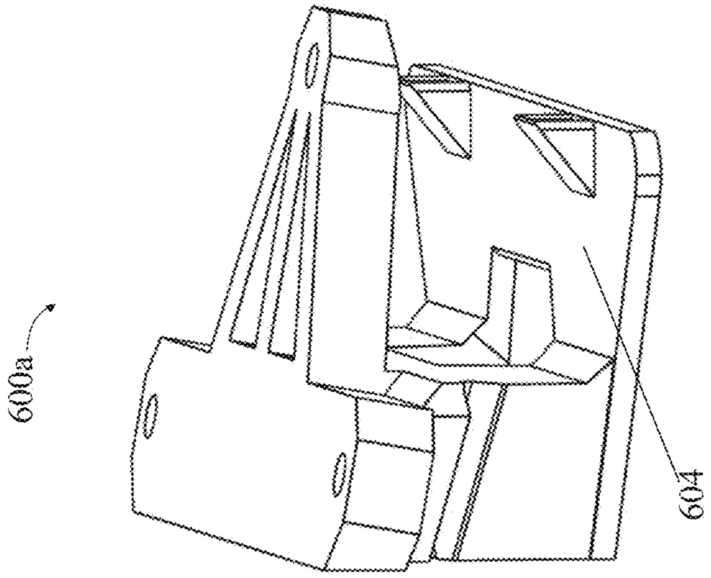
FIG. 6A is an illustration of an isometric view of an apparatus with at least a mounting interface.

Referring now to FIG. 6A, an illustration 600*a* of an isometric view of an apparatus with at least a mounting interface and FIG. 6B, an illustration 600*b* of a top view of an apparatus with at least a mounting interface. In an embodiment, the apparatus may include an attachment interface 604. In an embodiment, the attachment interface 604 may hold an antenna in place. In an embodiment, the apparatus includes at least a mounting interface 608 located opposite from the attachment interface. In an embodiment, the at least a mounting interface 608 utilizes magnets to permit an antenna to attach to any ferromagnetic metal. In an embodiment, the at least a mounting interface 608 includes three holes. In an embodiment, the three holes may be designed to mount one or more magnets. For instance, the three mounting holes may be threaded to receive a screw embedded in a magnet. In an embodiment, the configuration allows for the one or more magnets to be firmly attached to the mounting interface. In an embodiment, the one or more magnets may attach to a receptacle for the at least a mounting interface 608 as discussed below and where the receptacle is illustrated in FIG. 6E.

Figure 6D:
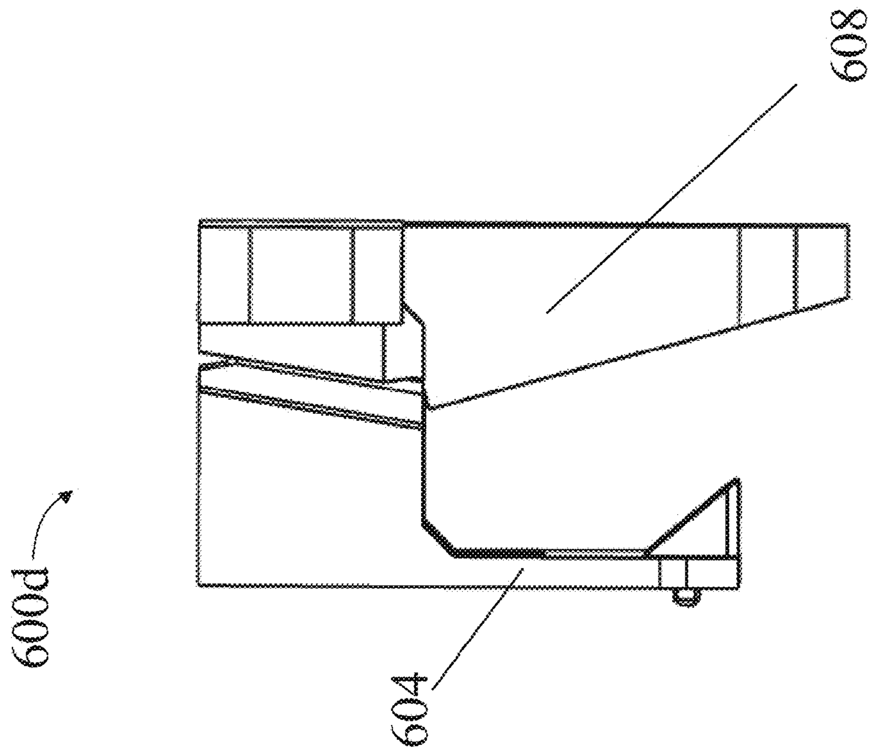
FIG. 6D is an illustration of a side view of an apparatus with at least a mounting interface with a 0 degree angle.
Figure 6C:
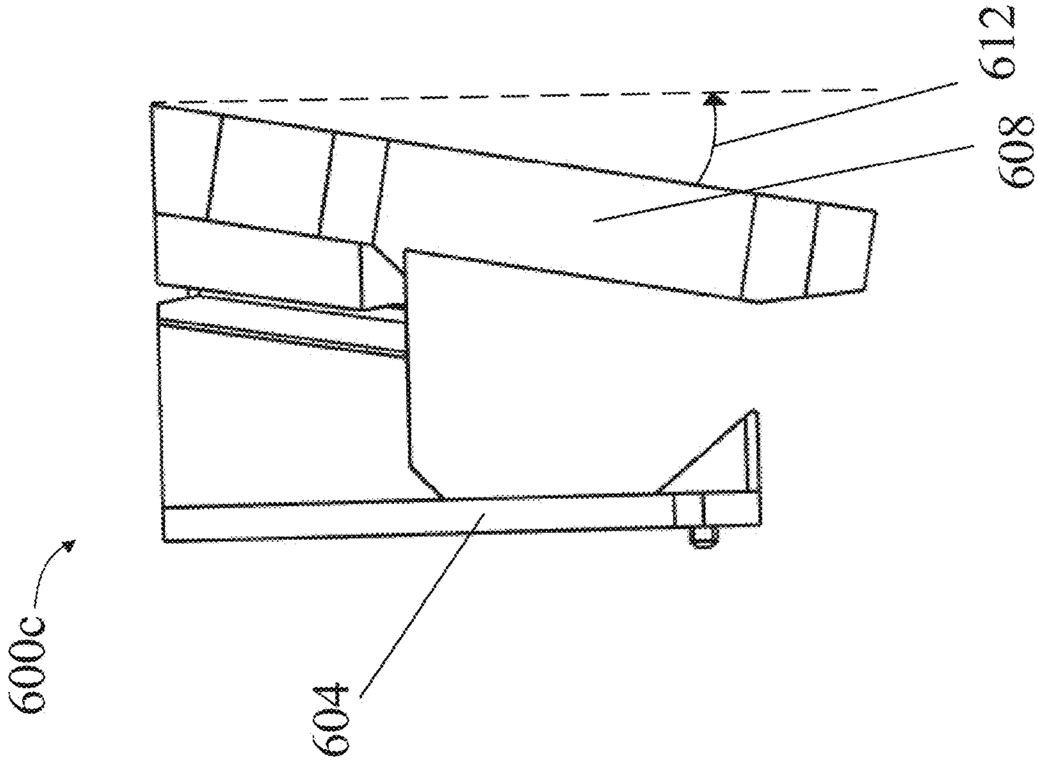
FIG. 6C is an illustration of a side view of an apparatus with at least a mounting interface with a 10 degree angle.

Referring now to FIG. 6C, an illustration 600*c* of a side view of an apparatus with at least a mounting interface with a 10 degree angle and FIG. 6D, an illustration 600*d* of a side view of an apparatus with at least a mounting interface with a 0 degree angle. In an embodiment, the apparatus includes an attachment interface 604. In an embodiment, the attachment interface 604 may hold an antenna in place.

In an embodiment, the apparatus includes at least a mounting interface 608 located opposite from the attachment interface. In an embodiment, the at least a mounting interface 608 may be positioned at an angle 612. In an embodiment, the angle 612 may be 10 degrees. In an embodiment, the angle 612 may improve alignment and orientation of the antenna, allowing for better signal transmission and reception. In an embodiment, the angle 612 may reduce interference or obstruction from other components, ensuring that the antenna is properly positioned for its intended function. In an embodiment, the angle 612 may be 0 degrees. In an embodiment, the mounting interface 608 may not be angled. In an embodiment, no angle on the mounting interface 608 may be useful for scenarios where direct alignment is required or when space constraints are important. In an embodiment, the angle 612 may be adjusted using an adjustment apparatus. Continuing, the adjustment apparatus may involve incorporating a pivoting mechanism at the mounting interface, allowing the user to rotate the interface to the desired angle. Continuing, the adjustment apparatus may use a set of adjustable screws or bolts that can be loosened to change the angle and then tightened to lock it in place. Continuing, the adjustment apparatus may involve using slotted holes in the mounting interface, allowing it to slide along a track to achieve different angles, such as from 0 degrees to 10 degrees or more. Continuing, the adjustment apparatus may include a ratcheting mechanism could be used, enabling incremental angle adjustments and secure positioning at set intervals.

Figure 6G:
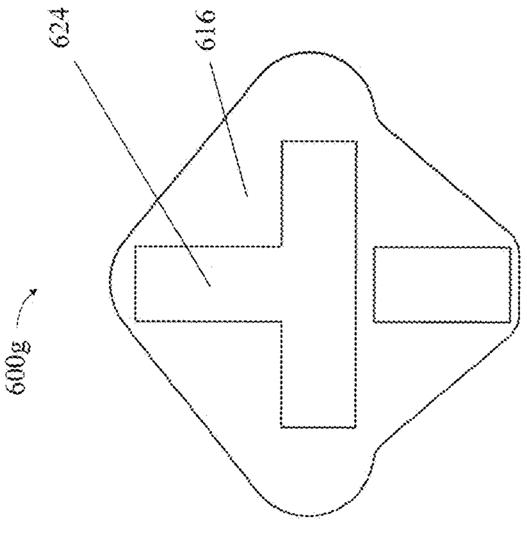
FIG. 6G is an illustration of a bottom view of a receptacle for at least a mounting interface.
Figure 6F:
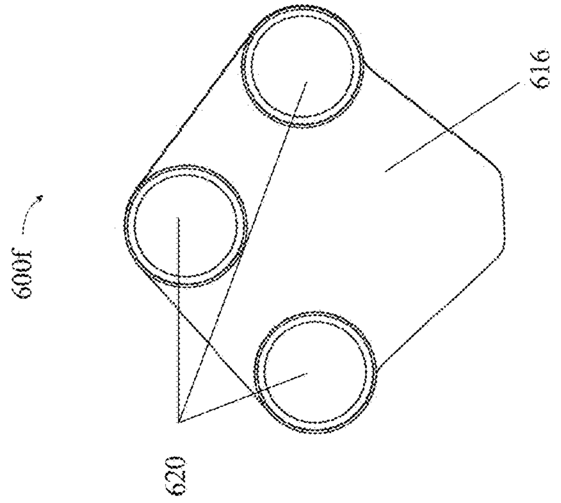
FIG. 6F is an illustration of a top view of a receptacle for at least a mounting interface.
Figure 6E:
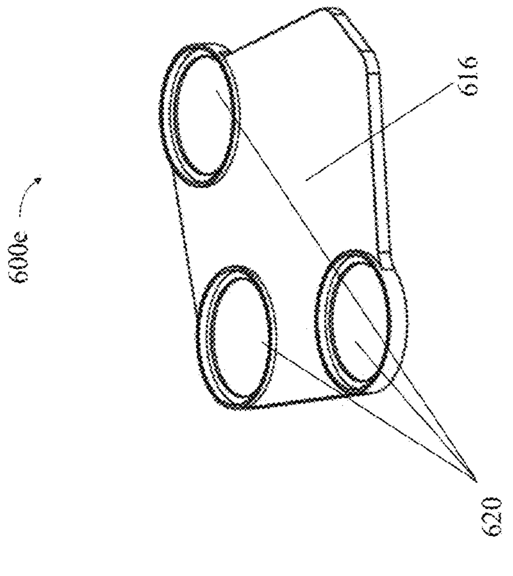
FIG. 6E is an illustration of an isometric view of a receptacle for at least a mounting interface.

Referring now to FIG. 6E, an illustration 600*e* of an isometric view of a receptacle for at least a mounting interface, FIG. 6F, an illustration 600*f* of a top view of a receptacle for at least a mounting interface, and FIG. 6G, an illustration 600*g* of a bottom view of a receptacle for at least a mounting interface. In an embodiment, the receptacle 616 may include three circular inlets 620. In an embodiment, the receptacle 616 may interface with the mounting interface 608. In an embodiment, one or more magnets may be used to attach the mounting interface 608 with the receptacle 616. In an embodiment, the receptacle 616 may mount directly to a surface, such as a dashboard. In an embodiment, the receptacle 616 may include a surface interface 624. In an embodiment, the surface interface 624 may include steel inlays. In an embodiment, the steel inlays may allow the antenna to be easily mounted and removed from the dashboard using, for instance, a magnetic bracket.

Figure 7B:
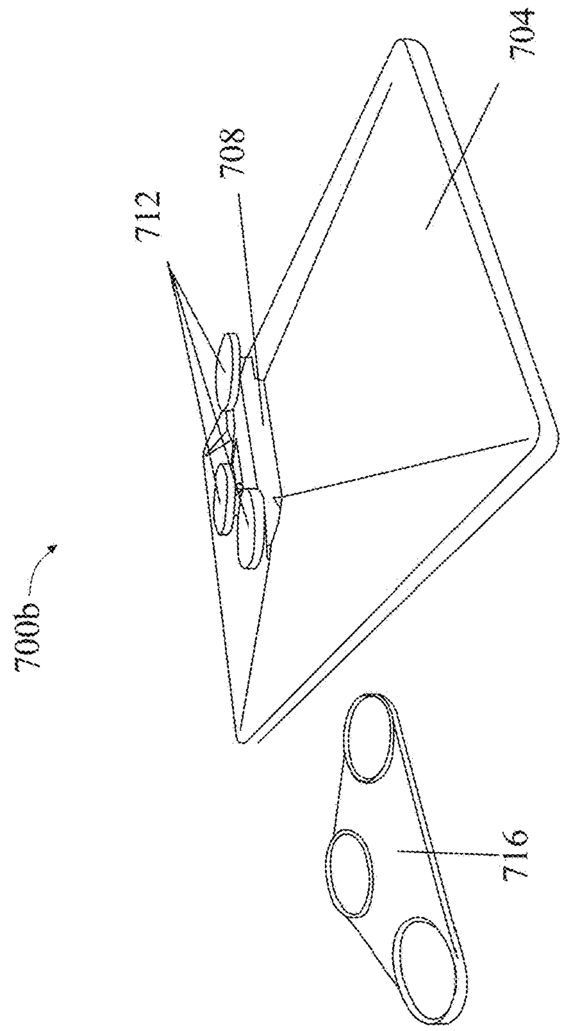
FIG. 7B is an illustration of an isometric view of an antenna attached to an apparatus using an attachment interface dismounted from a receptacle.
Figure 7A:
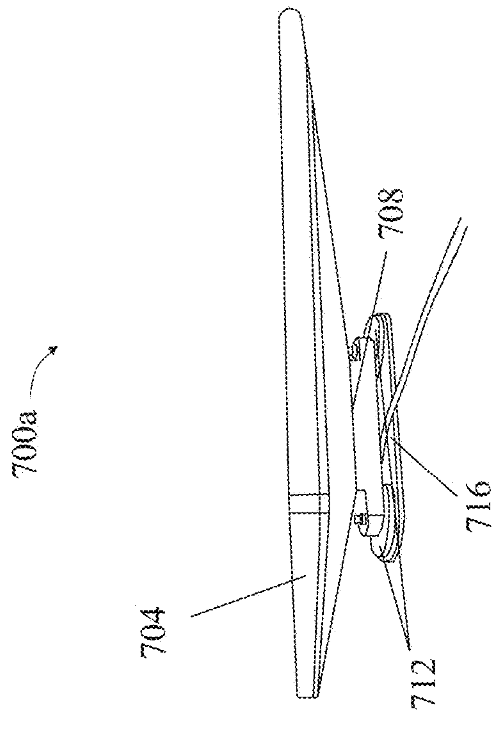
FIG. 7A is an illustration of an isometric view of an antenna attached to an apparatus using an attachment interface and mounted to a receptacle using at least a mounting interface.

Referring now to FIG. 7A, an illustration 700*a* of an isometric view of an antenna attached to an apparatus using an attachment interface and mounted to a receptacle using at least a mounting interface, and FIG. 7B, an illustration 700*b* of an isometric view of an antenna attached to an apparatus using an attachment interface dismounted from a receptacle. In an embodiment, the antenna 704 attaches directly to the attachment interface 708. In an embodiment, the attachment interface is located opposite the at least a mounting interface 712. In an embodiment, the at least a mounting interface 712 attaches to the receptacle 716. In an embodiment, the receptacle 716 is mounted directly to a surface which may be implemented as described and with reference to FIGS. 1-6E.

Figure 8:
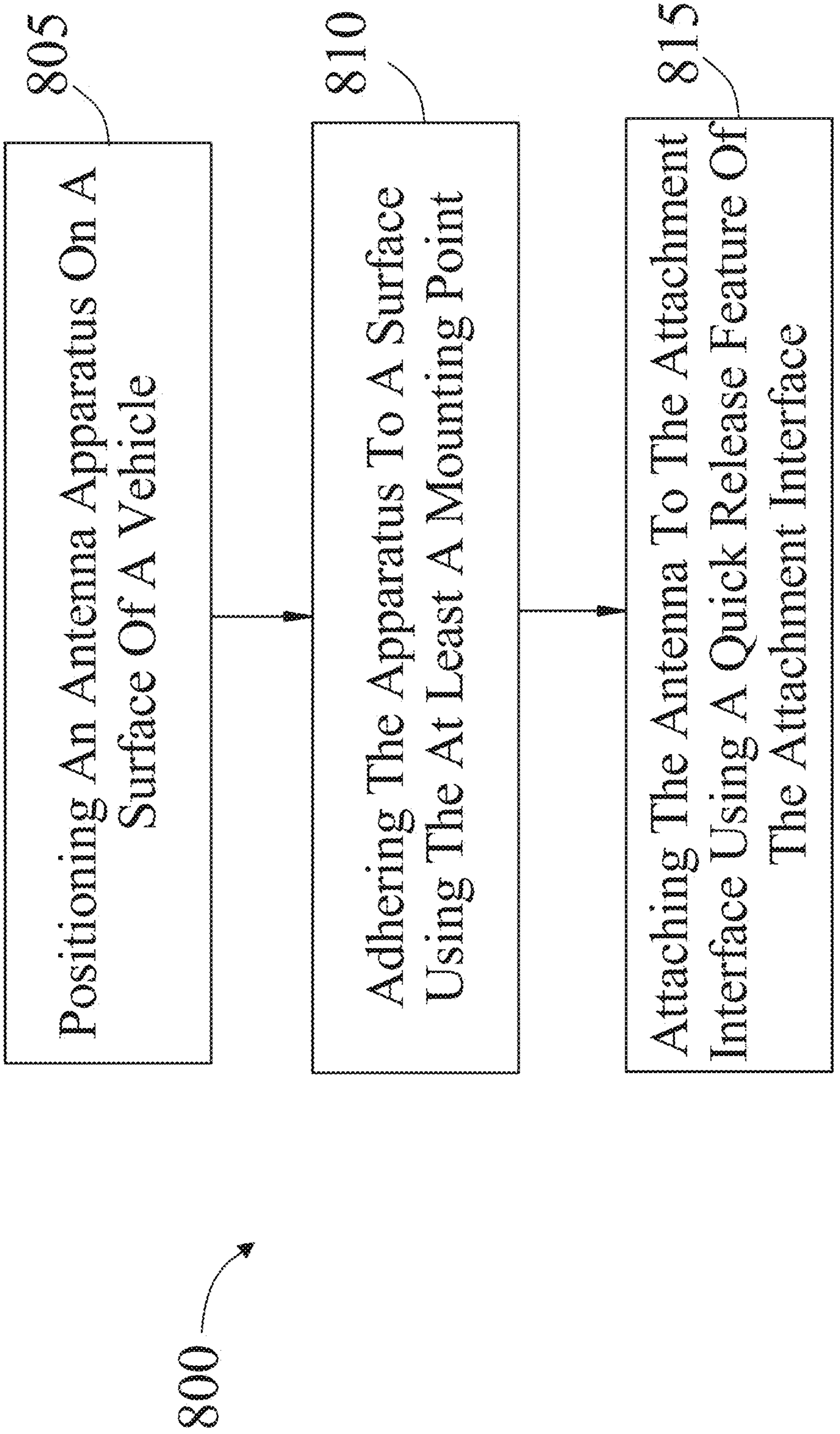
FIG. 8 is a block diagram of an exemplary method for mounting an antenna.

Referring now to FIG. 8, a flow diagram of an exemplary method 800 for mounting an antenna is illustrated. At step 805, method 800 includes positioning an antenna apparatus on a surface of a vehicle, wherein the antenna apparatus includes a body centrally located configured to coordinate a movement and positioning of the antenna, an attachment interface coupled to the body, at least a quick release feature, wherein the at least a quick release feature is configured to detach the antenna from the attachment interface, at least a member coupled to the body, wherein the at least a member extends away from the body, and at least a mounting point coupled to a distal end of the at least a member, the mounting points configured to secure the apparatus to a surface. This may be implemented as described and with reference to FIGS. 1-7B.

Still referring to FIG. 8, at step 810, method 800 includes adhering the apparatus to a surface using the at least a mounting point. In a non-limiting example, the apparatus may be mounted on either an interior or exterior surface of a vehicle. In an embodiment, the vehicle may include, but is not limited to, cars, ships, trains, aircraft, or any other mode of transportation. The mounting method may be adapted to various vehicle surfaces, such as the roof or side panels for exterior mounting, or the dashboard or interior ceiling for interior mounting. This may be implemented as described and with reference to FIGS. 1-7B.

Still referring to FIG. 8, at step 815, method 800 includes attaching the antenna to the attachment interface using a quick release feature of the attachment interface. This may be implemented as described and with reference to FIGS. 1-7B.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for mounting an antenna, the apparatus comprises:

a body centrally located configured to coordinate a movement and positioning of the antenna;

an attachment interface coupled to the body;

at least a quick release feature, wherein the at least a quick release feature is configured to detach the antenna from the attachment interface and comprises a push-button mechanism with a spring-loaded button located a rear of the apparatus;

at least three members coupled to the body, wherein each member of the at least three members extends away from the body, and each member of the at least three members has a proximal end coupled to the body and a distal end; and at least three mounting points, each mounting point of the at least three mounting points coupled to the distal end of a member of the at least three members, the at least a mounting point configured to secure the apparatus to a surface, and further comprising a plurality of suction cups wherein each of at least two of the at least three mounting points further comprises a suction cup of the plurality, of suction cups, and the plurality of suction cups are configured to secure the at least two mounting points to the surface.

2. The apparatus of claim 1, wherein the attachment interface comprises a universal joint.

3. The apparatus of claim 1, wherein the attachment interface further comprises a locking mechanism.

4. The apparatus of claim 1, wherein the attachment interface further comprises a linear slide is configured to allow translational movement of the antenna.

5. The apparatus of claim 1, wherein the attachment interface further comprises a gimbal configured to allow rotational movement of the antenna.

6. The apparatus of claim 1, wherein the attachment interface further comprises an adjustable groove, wherein the adjustable groove is configured be adjusted to accommodate multiple antenna models.

7. The apparatus of claim 1, wherein the attachment interface comprises vibration-dampening materials to minimize movement of the antenna, wherein the vibration-dampening materials include at least an elastomer.

8. The apparatus of claim 7, wherein the vibration-dampening materials further comprise a plurality of alternating layers of different materials.

9. The apparatus of claim 1, where in the at least a quick release feature comprises a second quick release feature securing the apparatus to the surface, wherein the second quick release feature comprises a clamp feature integrated into each suction cup of the plurality of suction cups.

10. The apparatus of claim 1, wherein each member of the at least three members comprises a telescopic mechanism, wherein the telescopic mechanism comprises a plurality of sections configured to slide within one another.

11. The apparatus of claim 1, wherein each member of the at least three members comprises a flexible material.

12. The apparatus of claim 1, wherein each mounting point of the at least three mounting points comprises a plurality of magnets.

13. The apparatus of claim 1, wherein each mounting point of the at least three mounting points is configured to allow rotational movement of the apparatus.

14. The apparatus of claim 1, wherein each mounting point of the at least three mounting points is configured to attach to irregular surfaces using a flexible mounting system.

15. The apparatus of claim 14, wherein the apparatus further comprises a support feature coupled to the at least a member.

16. The apparatus of claim 15, wherein one or more sealed joints are coupled to a member of the support feature.

17. The apparatus of claim 1, wherein the apparatus is made of one or more of aluminum, stainless steel, polycarbonate, and carbon fiber.

18. The apparatus of claim 1, wherein the attachment interface is configured to support multiple antennas simultaneously.

19. The apparatus of claim 1, further comprising a frame defining a structural boundary of the apparatus wherein the frame is attached to the attachment interface by the at least a member.

* * * * *